No. 827,020. PATENTED JULY 24, 1906.
T. HOWARD.
CUSHION TIRE.
APPLICATION FILED SEPT. 28, 1905.
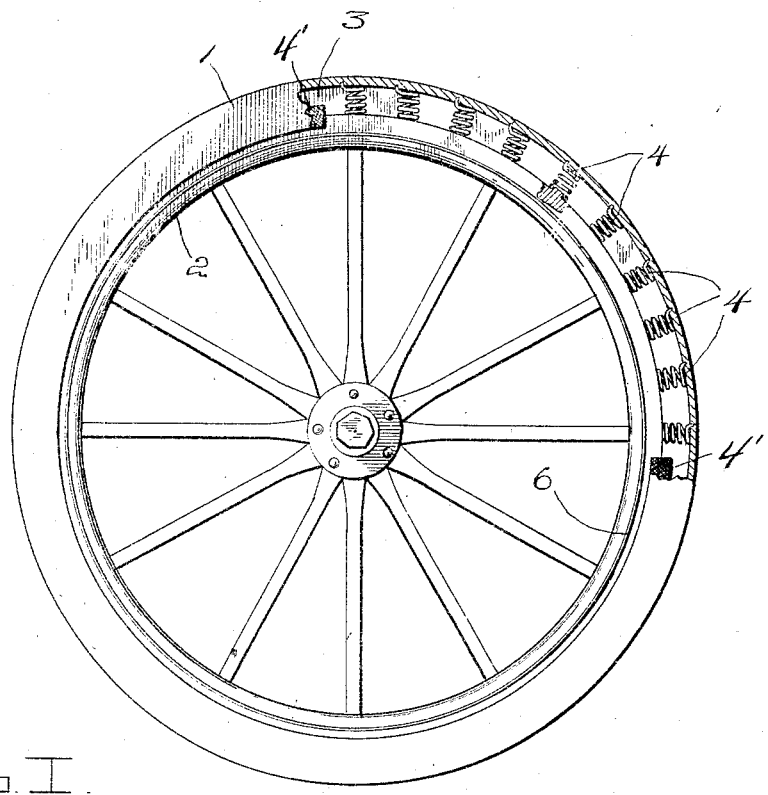
Fig. I.
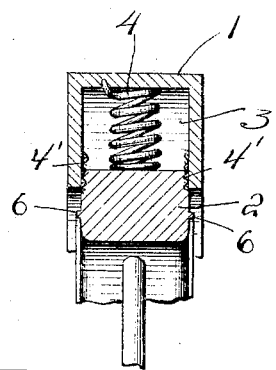
Fig. 2.
Witnesses
J. C. Simpson
E. M. Colford
Inventor
Thomas Howard
By
Chandlee & Chandlee
Attorneys

UNITED STATES PATENT OFFICE.

THOMAS HOWARD, OF PHILPOT, KENTUCKY.

CUSHION-TIRE.

No. 827,020.

Specification of Letters Patent.

Patented July 24, 1906.

Application filed September 28, 1905. Serial No. 280,524.

*To all whom it may concern:*

Be it known that I, THOMAS HOWARD, a citizen of the United States, residing at Philpot, in the county of Daviess, State of Kentucky, have invented certain new and useful Improvements in Cushion-Tires; and I do hereby declare the following to be a full, clear, and exact description of the invention, such as will enable others skilled in the art to which it appertains to make and use the same.

This invention relates to vehicle-wheels, and more particularly to the tires thereof.

One object is to provide a tire embodying such characteristics as to produce a cushioning effect without necessarily employing rubber tubes.

Another object of the invention resides in the provision of an exceedingly simple, inexpensive, durable, and efficient tire for vehicle-wheels.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is an elevation of a portion of a vehicle-wheel, partly in section, embodying my invention. Fig. 2 is a transverse sectional view of a portion of the rim of the wheel.

Referring now to the drawings, the present invention comprises an outer tire 1, which is channel-shaped in cross-section for the movable reception therein of an inner member 2.

It will be seen that each member 1 and 2 is formed of a single piece of material and that the member 2 fits between the side flanges of the channel-shaped outer member 1. Since the outer member 1 overlaps the inner member 2, there is very little, if any, possibility of dirt or other foreign material finding its way into the channel 3 of the outer member 1.

In order to hold the inner member 2 away from the bottom of the channel 3 of the outer member 1, I provide a series of helical springs 4, which latter are secured at one end to the bottom of the channel 3 and at their opposite end to the corresponding peripheral side of the inner member 2. By reason of these springs and their disposition with relation to the inner and outer members 1 and 2 a cushioning effect is manifest between the said members, and consequently in the event that the wheels strike an obstruction the resilient action between the members does not occasion jar to the vehicle. While danger of unnecessary noise or rattling between the members 1 and 2 in the use of the wheel is not liable, suitable material 4', properly treated—such, for instance, as cloth—may be used in any suitable manner between the said parts.

Lateral ribs 6 are formed upon the inner member 2 for engagement with the edges of the sides of the outer member 1 to limit the inward movement of the member 2 with respect to the member 1.

What is claimed is—

A cushioned tire comprising an outer member of channel shape, open at its inner periphery, an inner member movably engaged at its outer portion within the channel, springs located between the outer face of the inner member and the outer member, said inner member having lateral ribs arranged to receive the inner edges of the outer member thereagainst, to limit the inward movement of the outer member, and filling-pieces secured to the outer member and extending between the outer member and the side faces of the inner member.

In testimony whereof I affix my signature in presence of two witnesses.

THOMAS HOWARD.

Witnesses:
P. M. DINKELSPEEL,
MAMIE KELLY.